Feb. 2, 1954  G. R. HOFFMASTER  2,667,640
VENTILATED GOGGLES
Filed June 16, 1952  2 Sheets-Sheet 1
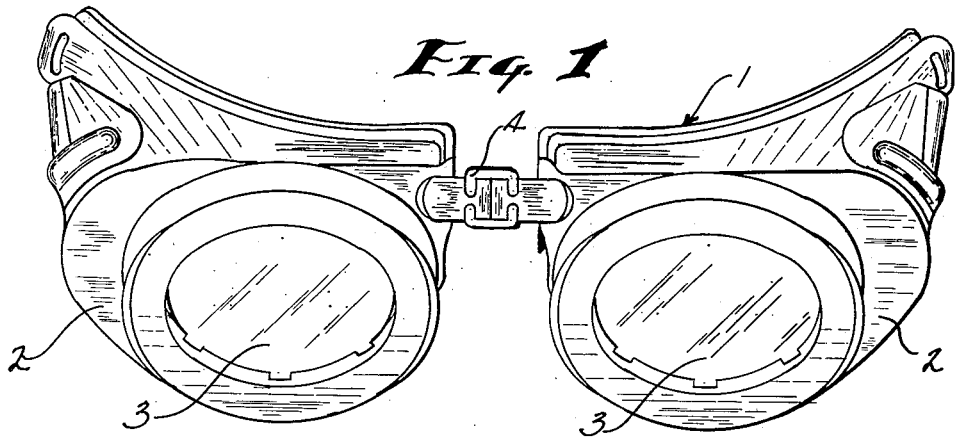
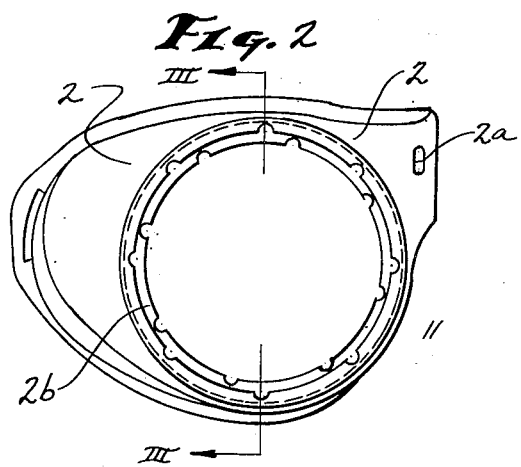
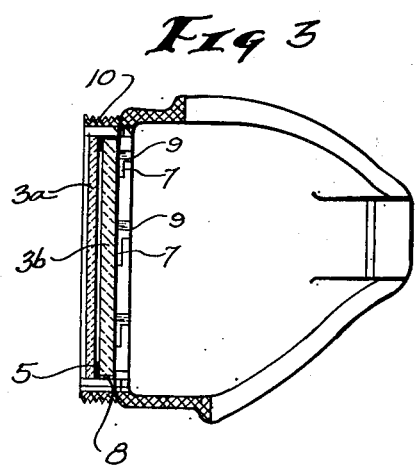
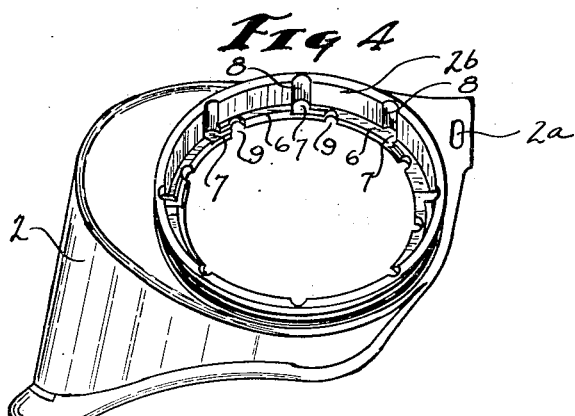
INVENTOR.
GEORGE R. HOFFMASTER
BY
William J. Ruano
ATTORNEY Feb. 2, 1954 G. R. HOFFMASTER 2,667,640
VENTILATED GOGGLES
Filed June 16, 1952 2 Sheets-Sheet 2
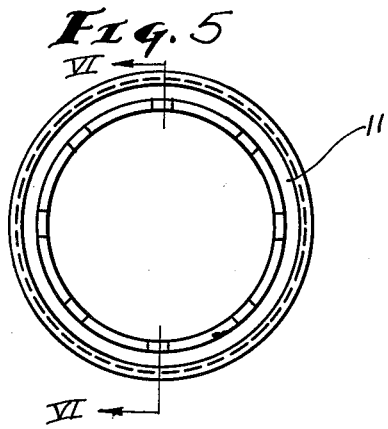
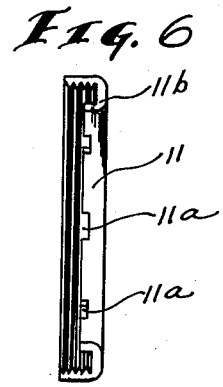
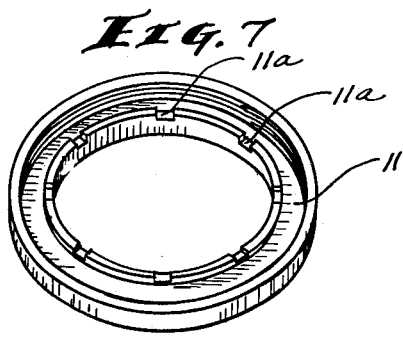
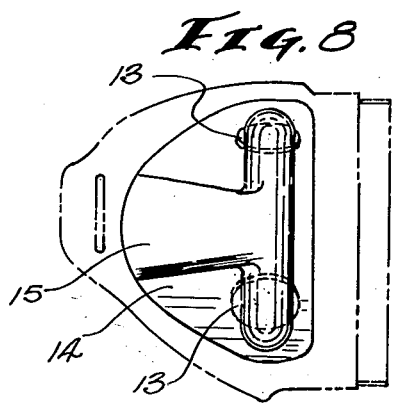
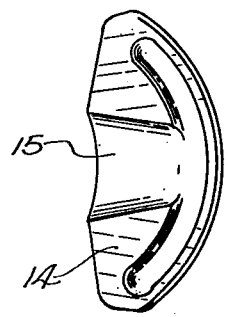
INVENTOR.
GEORGE R. HOFFMASTER
BY
William J. Ruano
ATTORNEY Patented Feb. 2, 1954

2,667,640

UNITED STATES PATENT OFFICE 2,667,640

VENTILATED GOGGLES

George R. Hoffmaster, Esterly, Pa., assignor to Willson Products, Inc., Reading, Pa., a corporation of Pennsylvania Application June 16, 1952, Serial No. 293,770

3 Claims. (Cl. 2—14)

This invention relates to goggles and, more particularly, to industrial goggles adapted for use in connection with welding, chipping, grinding and other industrial operations during which it is desired to protect the eyes from heat, light, sparks and other flying particles, and is particularly directed to ventilating means for such goggles.

It is well known in the art to provide ventilating openings of various kinds about the perimeter of goggle lenses and along the side pieces of the goggles. However, such conventional ventilating means have the outstanding disadvantage of being complicated in design and requiring difficult and time consuming molding operations and a plurality of separately molded parts, all of which add considerably to the cost of manufacture. Moreover, goggles having two part lenses generally have the further disadvantage that upon unscrewing of the lens retaining ring, the entire lens assembly falls out, increasing the danger of breakage and making lens replacement a delicate and somewhat tedious operation.

An object of the present invention is to provide goggles of the industrial type having novel ventilating means which are devoid of the above named disadvantages.

A more specific object of the present invention is to provide in the eye cups of industrial goggles, ventilating apertures of a construction that makes molding of the eye cups an extremely simple operation and requiring a minimum number of parts, also which efficiently and uniformly ventilates the entire inner surfaces of the goggle lenses.

A still further object of the present invention is to provide, in industrial goggles of the type having double lenses separated by a spacing ring, ventilating means of such construction that the outer lens may be easily removed and replaced without the necessity of disturbing or unseating the inner lens, therefore greatly facilitating lens replacement.

A still further object of the invention is to provide, in industrial goggles, a lens retaining assembly which embodies ventilating openings so disposed as not to be readily observable by others, therefore not detracting from the appearance of the goggles, and which openings are arranged so as to exclude light while effectively ventilating the interior of the eye cups, thus preventing fogging of the lenses and providing comfort to the wearer's eyes.

Other objects and advantages of the present invention will become apparent from a study of the following description, taken with the accompanying drawings wherein:

Figure 1 is a perspective view of a pair of industrial goggles embodying the principles of the present invention;

Figure 2 is an enlarged front view of one of the goggle eye cups shown in Figure 1 with the lenses removed;

Figure 3 is a cross-sectional view of the eye cup taken along line III—III of Figure 2 and showing the lenses mounted in place but without the lens retaining ring;

Figure 4 is a perspective view of the eye cup shown in Figures 2 and 3 with the lenses removed so as to more clearly show the ventilating air paths;

Figure 5 is a plan or front view of the lens retaining ring which is adapted to be screwed onto the outer threaded portion of the eye cup shown in Figures 3 and 4;

Figure 6 is a cross-sectional view taken along line VI—VI of Figure 5;

Figure 7 is a perspective view showing the inner portion of the lens retaining ring of Figures 5 and 6;

Figure 8 is a side view of the ventilating means for the side pieces of the goggles shown in Figure 1, and Figure 9 is a plan view of the attachable metal portion 14 shown in Figure 8.

Referring more particularly to Figures 1 to 4, inclusive, numeral 1 generally denotes a mask of molded plastic or other suitable material comprising a pair of eye cups 2 having perimetrical face engaging portions which are shaped so as to fit the contour surrounding the eyes of the wearer, each having a construction more clearly shown in Figures 2, 3 and 4. The eye cups are provided with extensions or ears, each having an aperture 2a and forming a part of the bridge portion of the goggles, through which apertures there may be extended an adjustable strap and buckle combination 4 forming a flexible nose bridge of adjustable length for insuring close fit between the perimetrical portions of the eye cups and the face of the wearer so as to exclude entry of light into the eye cups.

Each of eye cups 2 has a rim portion 2b having a radially inwardly extending integral annular ledge portion 6 forming a well for receiving lenses 3a and 3b. Lens 3b may be the darkened lens whose peripheral portion is seated directly on the ledge portion 6. The lenses are separated by a gasket or spacer ring 5 of rubber or other suitable material. The outer lens 3a may be of clear glass or plastic material which is resistant to flying sparks, metal chips, and the like, which usually accompany welding, grinding and chipping operations.

The goggles may be held tightly against the face of the wearer so as to exclude light by means of a flexible strap or headband (not shown) which is secured to the slots shown at the outer extremities of eye cups 2.

An important feature of the invention resides in the disposition of the air passages for allowing ventilation of the interior of the goggle cup which prevents fogging of the lenses as well as providing comfort for the wearer. Air inlet notches or openings 8 are disposed in spaced circumferential relationship and extend longitudinally of the rim portion 2b of the goggle cup. The annular ledge portion 6 supports lens 3b and is undercut or notched out at portions 7 thereof so as to provide air intercommunication between air inlet openings 8 and outlet openings 9 extending in the same direction as inlet openings 8, but being formed along the inner marginal edge of the ledge portion 6 instead of the outer marginal edge. Thus, air will enter from the outside through inlet openings 8, which are beyond the periphery of lenses 3a and 3b, and will then flow underneath peripheral portions of the lens 3b through the slots formed by the notched out portions 7, thence flowing outwardly through outlet openings 9 into the interior of the eye cup.

In order to retain lenses 3a and 3b in the position shown in Figure 3, there is screwed onto the outer threaded portion 10 of the rim 2a, a lens retaining ring 11 of the construction shown in Figures 5, 6 and 7. The lens retaining ring has an inwardly turned flange 11b which engages the outer peripheral surface of the outer lens 3a and exerts pressure thereagainst as the result of screwing of the ring onto the threaded portion 10. A plurality of notches 11a are cut out in spaced relationship about the periphery of flange 11b to serve as air inlet openings which communicate with the air inlet openings 8 in the eye cups. It will be apparent that the various ventilating openings are hardly visible to others. And, most important, the air inlet and air outlet openings are in staggered relationship so as to exclude light. More specifically, since light travels in straight lines, any stray light entering openings 8 would not be able to turn the corner to follow the path formed by notches 7 so as to enter the outlet openings 9. The above staggered openings have the additional advantage of preventing flying sparks or chips of metal from entering the goggle cup because of the tortuous path which they must follow in order to enter the goggle cup.

An outstanding advantage provided by the above assembly is that whenever it is necessary to replace the outer lens 3a, perhaps because of pitting thereof by flying sparks or chips, the lens retaining ring 11 is unscrewed and removed without allowing lenses 3a and 3b to fall out, as usually happens in conventional goggle constructions. Instead, they remain seated in the goggle cup so that by slight lifting with the fingers of the lower lens 3b so as to raise the outer lens 3a out of the well, it is possible to remove only the outer lens 3a without the removal of the colored lens 3b, thereby eliminating unnecessary removal and possible breakage or soiling of the darkened lens 3b during the replacement operation of the outer lens 3a.

Figures 8 and 9 show the ventilating means provided in the side pieces of the eye cups and which are of a construction so as to allow free entry of air with the exclusion of light from the interior of the eye cups. A pair of openings 13 are provided on side pieces of the eye cups and a separate piece 14, which may be of metal or plastic material, is secured onto the side pieces and is provided with a substantially T-shaped, bulged out portion 15. The rearmost extremity of the T provides an air inlet opening between it and the side piece of the eye cup and conducts air through the two legs of the T to the air inlet openings 13. Thus, well distributed ventilating air paths are provided along the sides of the goggles for providing comfort to the temples of the wearer and at the same time excluding light from the interior of the eye cups.

Thus it will be seen that I have provided an efficient pair of goggles having ventilating means so arranged as to exclude light and permit uniform ventilation of the interior of the eye cups by the employment of a minimum number of molded parts of rather simple design which can be inexpensively molded and assembled; also, I have provided efficient ventilating means for the side pieces of the goggles for distributing incoming air over widely separated portions of the temple and at the same time excluding light therefrom; furthermore, I have provided a ventilated goggle eye cup assembly for retaining a pair of lenses and for enabling replacement of the outer protecting lens without the necessity of removal or unseating of the inner colored lens.

While I have illustrated and described a certain specific embodiment of my invention, it will be understood that this is by way of illustration only, and that various changes and modifications may be made within the contemplation of my invention and within the scope of the following claims.

I claim:

1. A pair of goggles comprising lens retaining eye cups having flanged rim portions whose inner walls are of substantially the same diameter as the lenses received and centered thereby, each of said rim portions including a radially inwardly projecting annular shoulder portion, air inlet openings notched out of said rim portion radially outwardly beyond the periphery of the shoulder portion, air outlet openings notched out from circumferentially spaced portions of said shoulder portion in staggered relationship with said air inlet openings, and cutout portions notched from the outer surface of said shoulder portion at circumferentially spaced points, extending between and overlapping said inlet and outlet openings, whereby air may enter beyond the periphery of each lens then travel circumferentially underneath the lens through a small arc and finally emerge through said outlet openings into the interior of the eye cup.

2. A goggle eye cup comprising an outwardly projecting rim portion for receiving and centering a goggle lens of substantially the same diameter, a radially inwardly projecting annular ledge portion integrally formed adjacent the bottom of said rim portion to provide a lens seat, longitudinally extending circumferentially spaced notches formed on the interior surface of said rim portion so as to form air inlet openings to conduct outside air to the inner surface of the lens, notched out outlet openings disposed in circumferentially spaced, offset relationship with respect to said notches and on said ledge portion, cutout portions on the lens seat of said ledge portion extending between and overlapping said air inlet and outlet openings for conducting air along the inner surface of the lens and thence outwardly through said outlet openings into the interior of the eye cup an internally threaded lens retaining ring screw threadedly connected to the exterior of said rim portion and having an inturned marginal flange spaced from said rim portion and being provided with a plurality of circumferentially spaced notches to communicate with said air inlet openings.

3. Industrial goggles including means for ventilating the side pieces thereof, comprising a pair of vertically spaced openings in each side piece, and a cover piece overlying a portion of the side piece and said openings and including a substantially T-shaped, bulged out portion forming an air conduit for leading the air into said pair of openings, the leg of the T forming the sole air inlet opening and the extremities of the T forming the sole air outlet openings communicating with said pair of spaced openings.

GEORGE R. HOFFMASTER.

References Cited in the file of this patent

UNITED STATES PATENTS

| Number | Name | Date |
|---|---|---|
| 1,905,130 | Binder | Apr. 25, 1933 |
| 2,339,078 | Ingwersen | Jan. 11, 1944 |